(12) United States Patent
Nelson et al.

(10) Patent No.: US 11,979,498 B2
(45) Date of Patent: *May 7, 2024

(54) SYSTEM AND METHOD FOR SECURELY TRANSFERRING DATA USING GENERATED ENCRYPTION KEYS

(71) Applicant: Eclypses, Inc., Marco island, FL (US)

(72) Inventors: Robert E. Nelson, Franktown, CO (US); Aron J. Seader, Colorado Springs, CO (US)

(73) Assignee: Eclypses, Inc., Marco Island, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,416

(22) Filed: Aug. 1, 2022

(65) Prior Publication Data

US 2022/0368526 A1 Nov. 17, 2022

Related U.S. Application Data

(63) Continuation of application No. 16/792,703, filed on Feb. 17, 2020, now Pat. No. 11,405,203.

(51) Int. Cl.
*H04L 9/06* (2006.01)
*H04L 9/08* (2006.01)
*H04L 9/14* (2006.01)

(52) U.S. Cl.
CPC ............... *H04L 9/14* (2013.01); *H04L 9/06* (2013.01); *H04L 9/0869* (2013.01); *H04L 9/0891* (2013.01)

(58) Field of Classification Search
CPC ............ H04W 12/0471; H04W 12/03; H04W 12/041; H04L 9/0891; H04L 9/12; H04L 9/14; H04L 9/06; H04L 9/0861; H04L 9/0869

See application file for complete search history.

(56) References Cited

U.S. PATENT DOCUMENTS

| | | | |
|---|---|---|---|
| 5,654,531 A | 8/1997 | Farabee et al. | |
| 5,748,740 A | 5/1998 | Curry et al. | |
| 5,889,860 A | 3/1999 | Eller et al. | |
| 5,917,913 A | 6/1999 | Wang | |

(Continued)

FOREIGN PATENT DOCUMENTS

| | | |
|---|---|---|
| WO | 2001/080141 | 10/2001 |
| WO | 2006/094316 | 9/2006 |

(Continued)

OTHER PUBLICATIONS

International Search Report and Written Opinion PCT/US2019/019096, dated Jun. 6, 2019.

(Continued)

*Primary Examiner* — Mohammad A Siddiqi
(74) *Attorney, Agent, or Firm* — AKERMAN LLP

(57) ABSTRACT

According to one example, a system includes a second computing device that has one or more processors configured to receive encrypted data from a first computing device, the encrypted data being encrypted based on a first encryption key. The one or more processors are further configured to generate a second encryption key that matches the first encryption key, decrypt the encrypted data using the second encryption key, and transmit the data for use.

15 Claims, 3 Drawing Sheets

(56) References Cited

U.S. PATENT DOCUMENTS

| | | | |
|---|---|---|---|
| 6,148,342 | A | 11/2000 | Ho |
| 6,173,207 | B1 | 1/2001 | Eidson |
| 7,171,693 | B2 | 1/2007 | Tucker et al. |
| 7,568,114 | B1 | 7/2009 | Schlafly |
| 7,720,864 | B1 | 5/2010 | Muth et al. |
| 7,937,579 | B2 | 5/2011 | Peckover |
| 7,941,376 | B2 | 5/2011 | Peckover |
| 7,970,669 | B1 | 6/2011 | Santos |
| 8,055,913 | B2 | 11/2011 | Ginter et al. |
| 8,077,871 | B2 | 12/2011 | Kato |
| 8,261,058 | B2 | 9/2012 | Peckover |
| 8,290,150 | B2 | 10/2012 | Erhart |
| 8,359,271 | B2 | 1/2013 | Peckover |
| 8,379,857 | B1* | 2/2013 | Zheng .................. H04L 63/062 380/255 |
| 8,543,806 | B2 | 9/2013 | Peckover |
| 8,613,107 | B2 | 12/2013 | Peckover |
| 8,639,947 | B2 | 1/2014 | Elovici et al. |
| 8,670,564 | B1* | 3/2014 | Clayton ................ H04L 9/3013 380/46 |
| 8,826,448 | B2 | 9/2014 | Peckover |
| 8,965,066 | B1 | 2/2015 | Derakhshani et al. |
| 9,009,829 | B2 | 4/2015 | Stolfo et al. |
| 9,037,858 | B1 | 5/2015 | Juels et al. |
| 9,921,561 | B2 | 3/2018 | Schoenberg |
| 10,042,589 | B2 | 8/2018 | Schoenberg |
| 10,289,816 | B1 | 5/2019 | Malassenet |
| 10,291,403 | B2 | 5/2019 | Ligatti |
| 10,452,320 | B2 | 10/2019 | Schoenberg |
| 10,503,133 | B2 | 12/2019 | Schoenberg |
| 10,601,817 | B2* | 3/2020 | Lee .................... H04L 63/0853 |
| 11,012,722 | B2 | 5/2021 | Reynolds |
| 11,329,963 | B2 | 5/2022 | Reynolds |
| 11,405,203 | B2* | 8/2022 | Nelson .................. H04L 9/0861 |
| 2002/0026321 | A1 | 2/2002 | Faris et al. |
| 2002/0112178 | A1 | 8/2002 | Scherr |
| 2002/0178370 | A1 | 11/2002 | Gurevich |
| 2003/0182565 | A1* | 9/2003 | Nakano ................ H04L 63/064 713/193 |
| 2004/0165726 | A1* | 8/2004 | Yamamichi ........... H04L 9/0869 380/277 |
| 2004/0223611 | A1 | 11/2004 | Yan |
| 2005/0125150 | A1 | 6/2005 | Wang et al. |
| 2005/0235163 | A1 | 10/2005 | Forienza |
| 2005/0256822 | A1 | 11/2005 | Hollingworth |
| 2006/0010074 | A1 | 1/2006 | Zeitsiff et al. |
| 2006/0126838 | A1 | 6/2006 | Taieb |
| 2006/0236131 | A1* | 10/2006 | Vauclair .................. G06F 21/85 713/194 |
| 2007/0177718 | A1* | 8/2007 | Shimosato ......... H04N 21/4405 348/E7.056 |
| 2007/0250930 | A1 | 10/2007 | Aziz et al. |
| 2008/0065891 | A1 | 3/2008 | Karamchedu et al. |
| 2008/0222734 | A1 | 9/2008 | Redlich et al. |
| 2008/0244721 | A1 | 10/2008 | Barrus |
| 2008/0270764 | A1 | 10/2008 | McMillen et al. |
| 2008/0298583 | A1* | 12/2008 | Ahmed ................... H04L 9/065 380/46 |
| 2008/0307005 | A1 | 12/2008 | Pettigrew, Jr. |
| 2009/0106154 | A1 | 4/2009 | Reynolds et al. |
| 2009/0254572 | A1 | 10/2009 | Redich et al. |
| 2010/0092048 | A1 | 4/2010 | Pan et al. |
| 2010/0250497 | A1 | 9/2010 | Redlich et al. |
| 2010/0280909 | A1 | 11/2010 | Zhang et al. |
| 2010/0299529 | A1* | 11/2010 | Fielder .................. G06F 21/602 713/181 |
| 2010/0306072 | A1 | 12/2010 | Ford, Jr. et al. |
| 2011/0047081 | A1 | 2/2011 | Kelly et al. |
| 2011/0083020 | A1 | 4/2011 | Michiels et al. |
| 2011/0161671 | A1 | 6/2011 | Whitehouse |
| 2012/0042162 | A1 | 2/2012 | Anglin et al. |
| 2013/0097085 | A1 | 4/2013 | Peckover |
| 2013/0117561 | A1 | 5/2013 | Chawla et al. |
| 2013/0136258 | A1 | 5/2013 | Grube |
| 2013/0212666 | A1 | 8/2013 | Mattsson |
| 2013/0218738 | A1 | 8/2013 | Senapati et al. |
| 2013/0339697 | A1 | 12/2013 | Bonanno et al. |
| 2014/0023193 | A1 | 1/2014 | Landheer |
| 2014/0115724 | A1 | 4/2014 | Van Brandenburg |
| 2014/0126718 | A1 | 5/2014 | Movshovitz |
| 2014/0279553 | A1 | 9/2014 | Kassemi et al. |
| 2015/0088720 | A1 | 3/2015 | Acuña-Rohter et al. |
| 2015/0244573 | A1 | 8/2015 | Pirko |
| 2015/0244574 | A1 | 8/2015 | Pirko |
| 2015/0270955 | A1 | 9/2015 | Arnold et al. |
| 2015/0278085 | A1 | 10/2015 | Bybell et al. |
| 2016/0112381 | A1 | 4/2016 | Bhattacharyya |
| 2016/0241400 | A1* | 8/2016 | Wolf ..................... H04L 9/0869 |
| 2016/0267022 | A1 | 9/2016 | Schoenberger et al. |
| 2016/0274912 | A1 | 9/2016 | Schoenberger et al. |
| 2017/0012974 | A1 | 1/2017 | Sierra |
| 2017/0026174 | A1 | 1/2017 | Pang |
| 2017/0155628 | A1* | 6/2017 | Rohloff .................. H04L 63/02 |
| 2017/0208045 | A1 | 7/2017 | Huh et al. |
| 2017/0294054 | A1* | 10/2017 | Rosenbaum ...... H04L 12/40032 |
| 2018/0034632 | A1 | 2/2018 | De Atley |
| 2018/0052731 | A1* | 2/2018 | Grube .................... H04L 67/10 |
| 2019/0028266 | A1* | 1/2019 | Darmon ............... H04L 9/0662 |
| 2019/0261028 | A1 | 8/2019 | Reynolds |
| 2019/0372945 | A1 | 12/2019 | Reynolds |

FOREIGN PATENT DOCUMENTS

| | | |
|---|---|---|
| WO | 2012000091 | 1/2012 |
| WO | 2019/165175 | 8/2019 |

OTHER PUBLICATIONS

Your Challenge—Secure Cloud System, http://securecloudsystems.com/our-solutions/your-challenge/, Nov. 12, 2015.

BizTalk Server: List of Third-Party Adapters, http://social.technet.microsoft.com/wiki/contents/articles/12956.biztalk-server-list-of-third-party-adapters.aspx, Nov. 12, 2015.

Oracle Trading Community Architecture User Guide, http://docs.oracle.com/cd/E18727_01/doc.121/e13570/T172155T172160.htm, pp. 1-21, Nov. 12, 2015.

Transcertain, https://web.archive.org/web/20121204005735/http://www.transcertain.com/Services.html#CertainStore, Nov. 12, 2015.

Alexandrov et al., "Superweb: Research Issues in Java-Based Global Computing", Department of Computer Science, University of California, 1996.

Ajmani et al., "A Trusted Third-Party Computation Service", MIT Laboratory for Computer Science, 2001.

International Search Report and Written Opinion, PCT/US16/22897, dated Jun. 16, 2016.

International Search Report and Written Opinion, PCT/US2022/018903, dated Aug. 15, 2022.

* cited by examiner

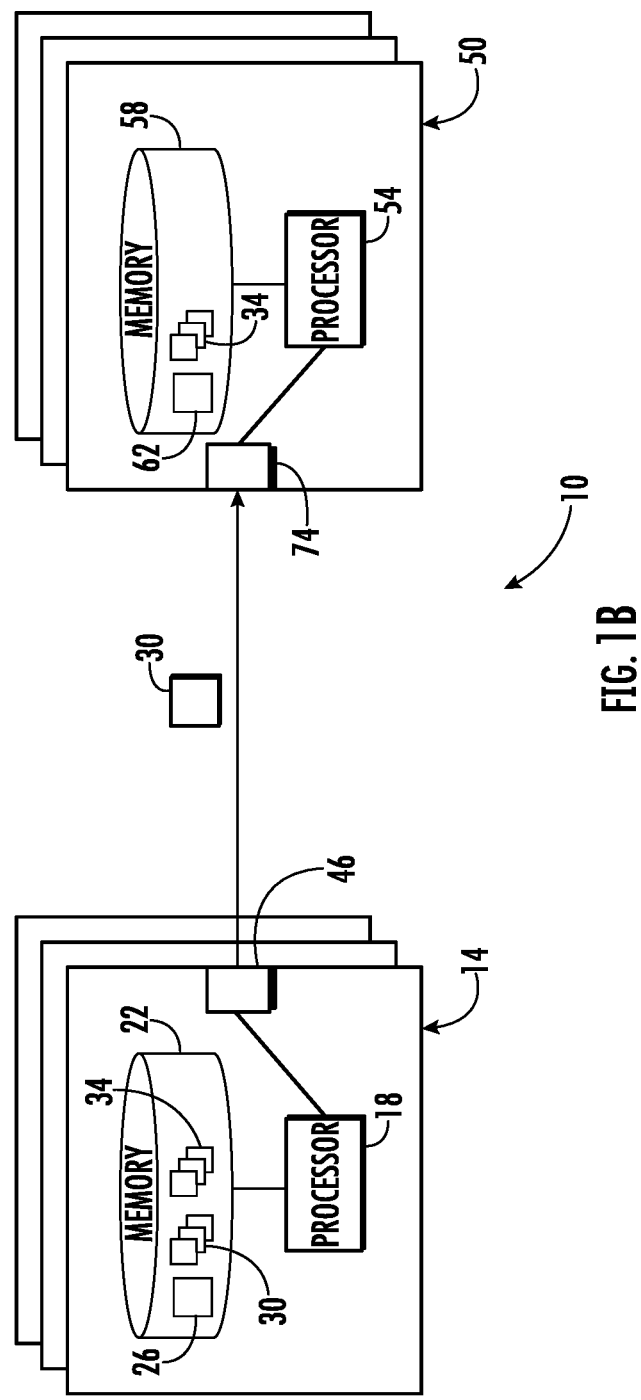

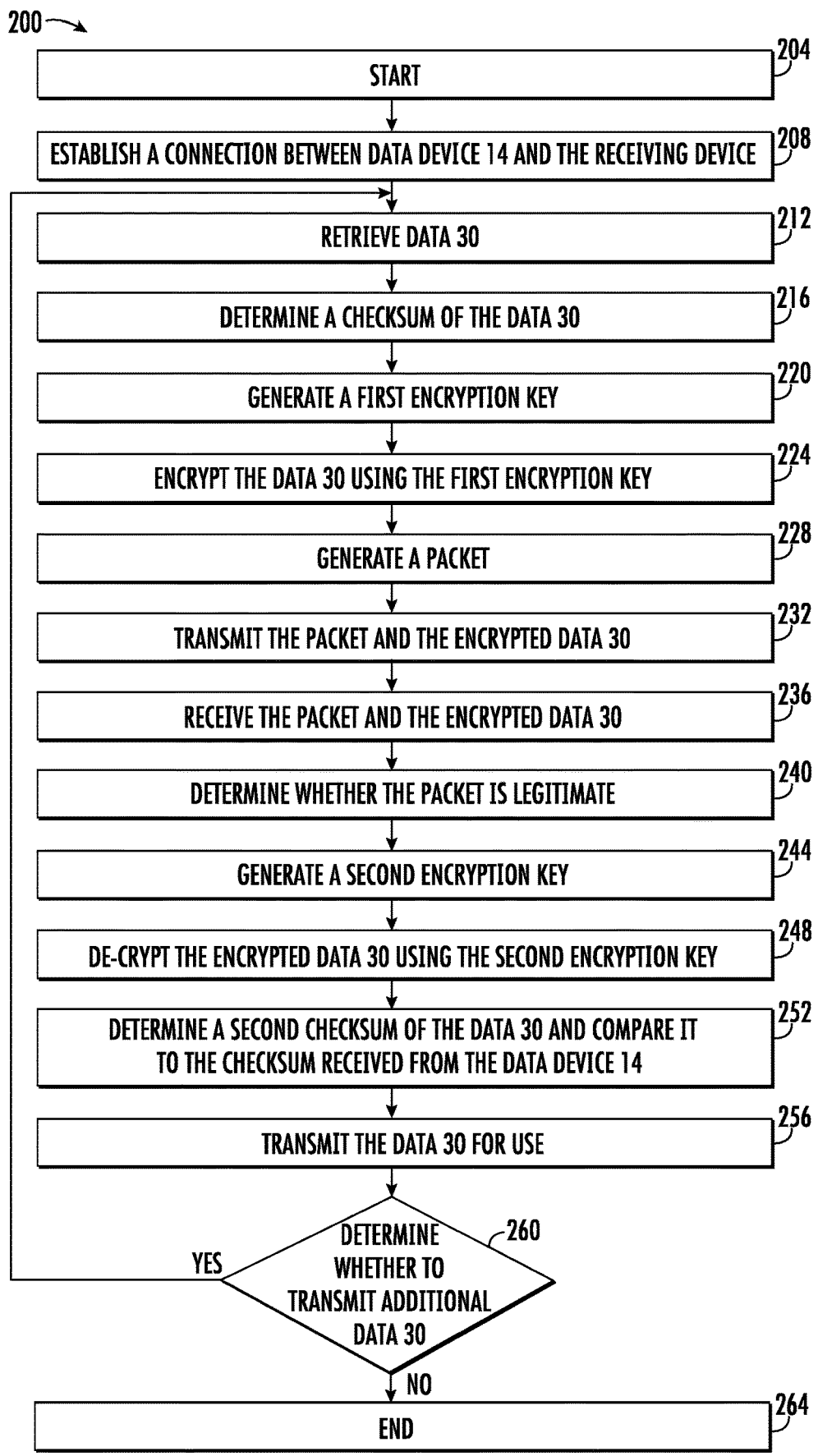

SYSTEM AND METHOD FOR SECURELY TRANSFERRING DATA USING GENERATED ENCRYPTION KEYS

CROSS-REFERENCE TO RELATED APPLICATIONS

This application is a continuation of U.S. application Ser. No. 16/792,703, filed Feb. 17, 2020, the entire contents of which are hereby incorporated by reference.

TECHNICAL FIELD

This disclosure relates generally to the field of computer-based communication, and more specifically to a system and method for securely transferring data using generated encryption keys.

BACKGROUND

Typically, a device may transmit data to another device in an unsecured manner or using traditional security measures (e.g., Secure Sockets Layer (SSL) protocol). These traditional methods of transferring data, however, may be deficient.

SUMMARY

In a first example, a system includes a first computing device that has one or more first memory units and one or more first processors coupled to the first memory units. The first processors are configured, upon executing one or more first instructions, to generate a first encryption key, encrypt, using the first encryption key, data for transmittal to a second computing device, and transmit the encrypted data for receipt by the second computing device. The system further includes the second computing device, that has one or more second memory units, and one or more second processors coupled to the second memory units. The second processors are configured, upon executing one or more second instructions, to receive the encrypted data, generate a second encryption key that matches the first encryption key, decrypt the encrypted data using the second encryption key, and transmit the data for use.

In a second example, a system includes a second computing device that has one or more memory units, and one or more processors coupled to the memory units. The processors are configured, upon executing one or more instructions, to receive encrypted data from a first computing device, where the encrypted data is encrypted based on a first encryption key. The processors are further configured to generate a second encryption key that matches the first encryption key, decrypt the encrypted data using the second encryption key, and transmit the data for use.

In such an example, the processors may be further configured to generate the second encryption key by pseudo randomly generating the second encryption key.

In such an example, the processors may be further configured to generate the second encryption key using one or more seed values.

In such an example, the processors may be further configured to delete the second encryption key.

In such an example, the second encryption key may be identical to the first encryption key.

In such an example, the processors may be further configured to generate the second encryption key in real time after receiving the encrypted data.

In such an example, transmitting the data for use may include transmitting the data for storage or transmitting the data for display to a user.

In such an example, the processors may be further configured to receive second encrypted data from the first computing device, wherein the second encrypted data is encrypted based on a third encryption key, generate a fourth encryption key that matches the third encryption key, decrypt the second encrypted data using the fourth encryption key, and transmit the second data for use.

In such an example, the data may be a frame of a video.

In such an example, the second computing device may be or may include a monitor.

In a third example, a method includes receiving, by one or more processors of a second computing device, encrypted data from a first computing device, where the encrypted data is encrypted based on a first encryption key. The method further includes generating, by the one or more processors of the second computing device, a second encryption key that matches the first encryption key, decrypting, by the one or more processors of the second computing device, the encrypted data using the second encryption key, and transmitting, by the one or more processors of the second computing device, the data for use.

BRIEF DESCRIPTION OF THE FIGURES

For a more complete understanding of the present disclosure and its features and advantages, reference is now made to the following description, taken in conjunction with the accompanying drawings, in which:

FIGS. 1A-1B illustrate an example system for securely transferring data; and

FIG. 2 illustrates an example method for securely transferring data.

DETAILED DESCRIPTION

Figure 1A:
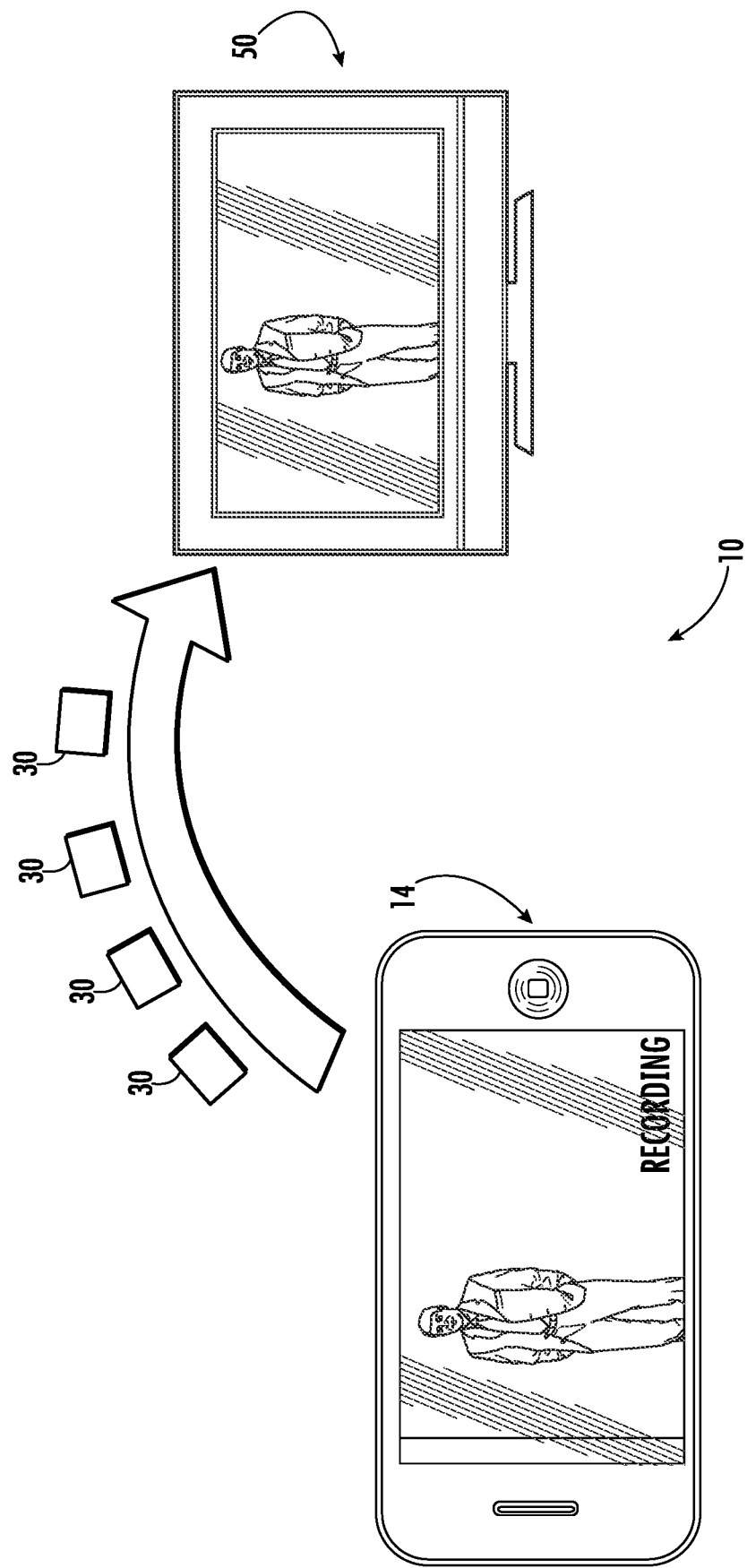

Embodiments of the present disclosure are best understood by referring to FIGS. 1-2 of the drawings, like numerals being used for like and corresponding parts of the various drawings.

Typically, a device may transmit data to another device in an unsecured manner. This, however, may be problematic, as an unauthorized entity (e.g., a hacker) may be able to listen to, capture, or otherwise access the transmitted data. Furthermore, even when the device transmits that data using traditional security measures, an unauthorized entity may still be able to access the data. For example, some data may be sent via SSL protocol, which may be susceptible to hacking. As another example, some data may be encrypted using one or more encryption keys prior to the data being sent. These encryption keys, however, are typically stored at the first device (i.e., the device sending the data) and/or the second device (i.e., the device receiving the data). As such, an unauthorized entity may hack one or more of these devices in order to obtain the encryption keys, thereby gaining access to the transmitted data.

Contrary to this, the system 10 of FIGS. 1A-1B may address one or more of these deficiencies. FIGS. 1A-1B illustrate an example system 10 for securely transferring data 30. As is illustrated, system 10 includes a data device 14 (e.g., a mobile phone) that stores data 30 (e.g., a video file being recorded on the phone). When the data device 14 is preparing to transmit data 30 (e.g., a portion of the video file) to a receiving device 50 (e.g., a smart monitor or smart display device), the data device 14 may generate (e.g., pseudo randomly generate) a first encryption key to be used to encrypt the data 30. Following encryption of the data 30, the encrypted data 30 may be transmitted to the receiving device 50. The actual first encryption key used to encrypt the data 30, however, may not be sent to the receiving device 50. Instead, the data device 14 may delete the first encryption key, without ever sending it.

Following reception of the encrypted data 30, the receiving device 50 may also generate (e.g., pseudo randomly generate) a second encryption key. This second encryption key may match the first encryption key (which was used to encrypt the data 30). The receiving device 50 may decrypt the encrypted data 30 using the second encryption key, and may then transmit the data 30 to a user of the receiving device 50 (e.g., the smart monitor or smart display device may display the video file to a user).

This example procedure may allow the data device 14 to securely transmit the data 30, in some examples. For example, not only may the data 30 be encrypted (thereby providing a first level of security), but the actual encryption key may not be transmitted to the receiving device 50 (thereby providing a second level of security). Additionally, because the actual encryption key may be generated by the receiving device 50, the actual encryption key may not need to be stored on disk in either the receiving device 50 or the data device 14 (thereby providing a third level of security). In some examples, this may prevent an unauthorized entity from listening, capturing, or otherwise accessing the data 30.

As is illustrated, the system 10 includes the data device 14. The data device 14 may be any device that stores data 30 and/or transmits data 30. For example, the data device 14 may be (or may include) a network server, any suitable remote server, a mainframe, a host computer, a workstation, a web server, a personal computer, a laptop, a mobile telephone (such as a Smartphone), an electronic notebook, a personal digital assistant, a file server, any other computing or processing device, any other device for storing data and/or transmitting that data, or any combination of the preceding. The functions of data device 14 may be performed by any suitable combination of one or more servers or other components at one or more locations. In an example where the data device 14 is a server, the server may be a private server, and the server may be a virtual or physical server. The server may include one or more servers at the same or remote locations. Also, data device 14 may be (or may include) any suitable component that functions as a server. As is illustrated in FIGS. 1A-1B, the data device 14 is a mobile telephone. Furthermore, as is also illustrated in FIG. 1B, the data device 14 may include a computer/data processor 18 and data storage medium 22 comprising instructions 26 executable by the processor 18 to perform the functions of the data device 14. Additionally, the data device 14 may include a communication port 46 (e.g., receiver, transmitter, transceiver) configured to receive and transmit information (e.g., receive requests for data 30, transmit the data 30, etc.). Further example details of data device 14 and/or its components are discussed below.

As is discussed above, the data device 14 may be any device that stores data 30 and/or transmits data 30. This data 30 represents any type of information. For example, the data 30 may be a document (e.g., a word document, an excel spreadsheet, a pdf), an audio file (e.g., a music file), a video file (e.g., a movie file, a tv show file, a video clip), a streaming audio file, a streaming video file, real-time video feed for a security system or any other monitoring system, a list of available video files, a list of available audio files, account information, medical information, commands (e.g., open, close, move to a particular location), any other type of information, or any combination of the preceding. As is illustrated in FIGS. 1A-1B, the data 30 is one or more frames of a video file. One example of a video file is a movie file that may be streamed to the receiving device 50, thereby allowing the user of the receiving device 50 to watch the movie without waiting for the full movie to download, in some examples. Another example of the video file is a video being recorded (in real time) by a camera in the data device 14 (e.g., the data device 14 may be a mobile telephone that is recording a video and transmitting the video to the receiving device 50). The data device 14 may store any amount of data 30. For example, the data device 14 may be associated with a video streaming service (e.g., NETFLIX, REDBOX, AMAZON VIDEO). In such an example, the data device 14 may store (or may be able to access) any and all video files available through the video streaming service.

The data device 14 may have one or more encryption methods 34 that may be used to encrypt the data 30. An encryption method 34 represents any type of encryption method that may be utilized to encrypt data and/or decrypt encrypted data. For example, an encryption method 30 may be Rivest-Shamir-Adleman (RSA), Data Encryption Standard (DES), triple DES (DES3), Advanced Encryption Standard (AES), AES-256, symmetric encryption methods, any other method of encryption, or any combination of the preceding. The data device 14 may have any number of encryption methods 34, each of which may be used to encrypt data.

One or more encryption keys (e.g., random strings of bits created for scrambling and unscrambling data) may be used with the encryption method(s) 34 to encrypt data and/or decrypt encrypted data. However, the data device 14 may not have any encryption keys stored on disk, in some examples. Instead, in some examples, the data device 14 may generate an encryption key in real-time prior to encryption of the data. In some examples, this real-time generation of the encryption key may cause the encryption key to only be stored in transient memory, as opposed to being stored on disk. Furthermore, once the encryption key is used by the data device 14, the encryption key may be deleted (e.g., deleted from transient memory) or otherwise destroyed. This may prevent the encryption key(s) from being compromised if an unauthorized entity were to access the data device 14. In some examples, the encryption key may not be deleted or otherwise destroyed.

To generate the encryption key(s), the data device 14 may utilize a pseudo random bit generator. A pseudo random bit generator may alternatively be referred to as a Deterministic Random Bit Generator (DRBG). Examples of a pseudo random bit generator (or a DRGB) include ISAAC (Indirection, Shift, Accumulate, Add, and Count), ISAAC-64, Hash DRBG SHA-1, Hash DRBG SHA-256, Cipher DRBG AES-128, Cipher DRBG AES-256, any other pseudo random bit generator (or DRBG), or any other system or method for creating deterministically random numbers.

As is illustrated, the system 10 further includes the receiving device 50. The receiving device 50 may be any device that receives and/or processes data 30. For example, the receiving device 50 may be (or may include) a personal computer, a laptop, a mobile telephone (such as a Smartphone), an electronic notebook, a personal digital assistant, a cable box, a networked television (such as a smart television), a smart monitor or smart display device, a smart projector, a host computer, a workstation, a web server, a network server, any suitable remote server, a mainframe, a file server, any other computing or processing device, any other device that receives and/or processes data 30, or any combination of the preceding. As is illustrated in FIGS. 1A-1B, the receiving device 50 is a smart monitor or smart display device. Furthermore, as is also illustrated in FIG. 1B, the receiving device 50 may include a computer/data processor 54 and data storage medium 58 comprising instructions 62 executable by the processor 54 to perform the functions of the receiving device 50. Additionally, the receiving device 50 may include a communication port 74 (e.g., receiver, transmitter, transceiver) configured to receive and transmit information (e.g., receive data 30, transmit requests for data 30). Further example details of receiving device 50 and/or its components are discussed below.

The receiving device 50 may have one or more encryption methods 34 that may be used to decrypt the data 30. The encryption methods 34 stored on the receiving device 50 may be the same as the encryption methods 34 stored on the data device 14. As such, the data device 14 may encrypt data 30 using a particular encryption method 34, and the receiving device 50 may decrypt the encrypted data 30 using the same particular encryption method 34. The receiving device 50 may have any number of encryption methods 34, each of which may be used to decrypt data.

As is discussed above, in some examples, one or more encryption keys are used with the encryption method(s) 34 to encrypt data 30 and/or decrypt encrypted data 30. However, the receiving device 50 may not have any encryption keys stored on disk, in some examples. Instead, in some examples, the receiving device 50 may generate an encryption key in real-time prior to decryption of the data 30. In some examples, this real-time generation of the encryption key may cause the encryption key to only be stored in transient memory, as opposed to being stored on disk. Furthermore, once the encryption key is used by the receiving device 50, the encryption key may be deleted (e.g., deleted from transient memory) or otherwise destroyed. This may prevent the encryption key(s) from being compromised if an unauthorized entity were to access the receiving device 50. In some examples, the encryption key may not be deleted or otherwise destroyed.

To generate the encryption key(s), the receiving device 50 may also utilize a random bit generator or a pseudo random bit generator. Examples of a random bit generator or a pseudo random bit generator include ISAAC 32, ISAAC 64, SHA-1, SHA-256, SHA-3, any other random bit generator, or any other pseudo random bit generator. The random bit generator or the pseudo random bit generator used by the receiving device 50 may be the same as the random bit generator or the pseudo random bit generator used by the data device 14. As such, the data device 14 may generate a first encryption key using a particular random bit generator or pseudo random bit generator, and the receiving device 50 may generate a second encryption key using the same particular random bit generator or pseudo random bit generator.

The second encryption key generated by the receiving device 50 may match the first encryption key generated by the data device 14. The second encryption key may match the first encryption key if the two encryption keys are identical (e.g., "58U48" and "58U48"). In other examples, the second encryption key may match the first encryption key in any other way that allows the second encryption key to be used to decrypt data 30 that was encrypted using the first encryption key.

Modifications, additions, or omissions may be made to system 10 without departing from the scope of the disclosure. For example, system 10 may include any number of data devices 14 and/or receiving devices 50 (and/or any number of components, such as processors or memory units illustrated or described in the above devices). Also, any suitable logic may perform the functions of system 10 and the components and/or devices within system 10. Furthermore, one or more components of system 10 may be separated, combined, and/or eliminated.

Additionally, although the data device 14 and receiving device 50 have been described above as having or storing information (e.g., storing data 30), in some examples, some (or all) of that information may not be stored by the data device 14 or the receiving device 50. Instead, the data device 14 and receiving device 50 may merely have access to that information (e.g., the information is stored elsewhere). For example, data device 14 may not store the data 30 that is transmitted. Instead, data device 14 may be able to access that data 30, and then data device 14 may transfer it to the receiving device 50.

Furthermore, although data device 14 and receiving device 50 have been described above as being separate devices, in some examples, they may both be integrated into the same device. In such an example, the data device 14 may refer to a first process being performed within a single device (e.g., within a server), and the receiving device 50 may refer to a second process being performed within the same single device (e.g., within the server). This may allow the single device to securely transfer data between two separate processes being performed by the single device. The device (e.g., a server) may utilize a first processor to perform the process of the data device 14, and may further utilize a second processor to perform the process of the receiving device 50. Alternatively, the process of the data device 14 and the process of the receiving device 50 may be performed by the same processor(s) within the single device.

FIG. 2 illustrates an example method for securely transferring data. As is illustrated, method 200 of FIG. 2 illustrates an example of securely transferring data 30 from data device 14 to receiving device 50 of FIGS. 1A-1B. However, the steps of method 200 may be utilized to securely transfer data 30 (or any other data) from any device to any other device.

Method 200 beings at step 204. At step 208, a connection is established between data device 14 and the receiving device 50. The connection may refer to any type of connection that allows the data device 14 to communicate with the receiving device 50 (and vice versa) so as to transfer data 30, in some examples.

In some examples, the connection process between the data device 14 and the receiving device 50 may include a pairing process. The pairing process may be any process that synchronizes the receiving device 50 with the data device 14. For example, the pairing process may involve sending one or more messages between the receiving device 50 and the data device 14 in order to synchronize the receiving device 50 with the data device 14. Such synchronization may include checking or verifying that both the receiving device 50 and the data device 14 have one or more of the same encryption methods 34, that both the receiving device 50 and the data device 14 have one or more of the same pseudo random bit generators, synchronizing the pseudo random bit generators, any other manner of synchronizing the receiving device 50 with the data device 14, or any combination of the preceding. In some examples, the pairing process may not be performed during the connection process. For example, the receiving device 50 and the data device 14 may have been previously paired (e.g., at the factory or in any other secure method or system) and may not need to paired again.

In some examples, if the receiving device 50 or the data device 14 is missing information used for synchronization (e.g., the receiving device 50 does not have the same pseudo random bit generator), the pairing process may cause the receiving device 50 or the data device 14 to generate the missing information, download the information, otherwise retrieve the missing information, or any combination of the preceding.

In some examples, the synchronization process may further include a synchronization of the pseudo random bit generator(s) included in the data device 14 and the receiving device 50. This synchronization the pseudo random bit generator(s) may allow the data device 14 and receiving device 50 to select the same encryption method 34 to use with a particular transfer of data 30, in some examples. For example, the synchronization of the pseudo random bit generator(s) may allow the data device 14 and receiving device 50 to both independently select the same first encryption method 34 (e.g., AES) to use for the transfer of first data 30 (e.g., a first frame of a video file). Furthermore, the synchronization of the pseudo random bit generator(s) may allow the data device 14 and receiving device 50 to both independently select to use the same second encryption method 34 (e.g., DES3) for the transfer of second data 30 (e.g., a second frame of a video file).

In some examples, the synchronization of the pseudo random bit generator(s) may occur in any manner. For example, to synchronize the pseudo random bit generator(s), the data device 14 and the receiving device 50 may both generate, determine, and/or receive one or more "seed" values (e.g., three seed values) that may be input into the pseudo random bit generators. These same "seed" value(s) may synchronize the pseudo random bit generator(s), causing them to independently generate matching encryption keys. These matching encryption keys may be used to encrypt data 30 and/or decrypt data 30. After this initial synchronization (i.e., initialization process or re-initialization process), one or more tokens (or other information) received during communication between the data device 14 and the receiving device 50 may be used to keep the pseudo random bit generator(s) synchronized, in some examples. Examples of tokens (and tokenization and detokenization) are discussed below, and are further discussed in U.S. Patent Application Publication No. 2019/0372945 entitled "System and Method for Securely Transferring Data (which is incorporated by reference herein).

The connection established between data device 14 and the receiving device 50 at step 208 may also (or alternatively) refer to (or include) an authentication procedure. For example, in order to receive data 30 from a data device 14, the receiving device 50 may authenticate itself to the data device 14. As an example of this, the receiving device 50 may log into an account established with the data device 14. In an example where the data device 14 is associated with a service, such as a file streaming service (e.g., NETFLIX), the user of the receiving device 50 may have an account with the service. In such an example, the connection may refer to (or include) the receiving device 50 logging into an account associated with the data device 14 using, for example, an account name and password. By logging into an account associated with the data device 14, the user of the receiving device 50 may be able to view the data 30 that is available to the user (e.g., a list of video files, the list of audio files).

At step 212, the data device 14 may retrieve data 30. The data device 14 may retrieve data 30 in any manner. For example, the data device 14 may retrieve the data 30 from data storage medium 22 or any other storage location. As another example, the data device 30 may retrieve the data 30 from one or more applications (e.g. "apps") installed on the data device 14. As a further example, the data device 14 may retrieve the data 30 from one or more devices that are generating the data 30. As an example of this, the data device 14 may retrieve the data 30 from a camera unit of the data device 14, where the camera unit is recording a scene in order to create the data 30. The data device 14 may retrieve the data 30 for any reason. For example, the data device 14 may retrieve the data 30 as a result of a user (of the data device 14) requesting that the data 30 be retrieved and transmitted, as a result of the receiving device 50 requesting the data 30, as a result of an application providing the data 30 to the data device 14, any other reason, or any combination of the preceding.

Following retrieval of the data 30, the data device 14 may determine a checksum of the data 30 at step 216. The checksum may allow errors to be detected in the data 30. For example, the checksum may be used to detect errors that have been introduced into the data 30 during its transmission and/or storage. The data device 14 may determine the checksum in any manner. For example, the data device 14 may determine the checksum using a checksum algorithm. In some examples, the checksum may be derived from the data 30 in its raw form.

At step 220, the data device 14 may generate a first encryption key. As is discussed above, the first encryption key may be any type of key that is used with one or more encryption methods 34 to encrypt data. The first encryption key may be a random string of bits created for scrambling and unscrambling data. The first encryption key may have any length, may have any bits, and may be generated using any method. For example, the encryption key may be generated using a pseudo random bit generator. In such an example, one or more seed values may be input into the pseudo random bit generator to generate the first encryption key (and any subsequent encryption key). The pseudo random bit generator and/or the seed value(s) may be selected in any manner. For example, the pseudo random bit generator and/or the seed value(s) may be selected during the pairing process discussed above. This may, in some examples, allow the data device 14 and the receiving device 50 to select the same pseudo random bit generator and/or the same seed value(s). In some examples, this selection may be part of an initialization process. After the initialization process, the data device 14 and the receiving device 50 may be able to select (or otherwise determine) the same seed value(s) at any time, without re-initialization.

The first encryption key may be generated in real time (e.g., generated only when it is needed for a secure transfer of data 30). This may prevent the first encryption key from having to be stored on disk. Instead, the first encryption key may only be stored in transient memory, as opposed to being stored on disk. Furthermore, once the first encryption key is used to encrypt the data 30, the first encryption key may be deleted (e.g., deleted from transient memory) or otherwise destroyed. As such, the first encryption key may be a one-time use encryption key that is destroyed after its use. This may prevent the first encryption key from being compromised if an unauthorized entity were to access the data device 14. In some examples, the first encryption key may not be deleted or otherwise destroyed.

The generation of the first encryption key by the data device 14 may refer to the data device 14 generating the first encryption key itself, or may refer to the data device 14 causing the first encryption key to be generated. For example, the data device 14 may generate the first encryption key by calling into a library or application installed or accessible to the data device 14, and having the library or application generate the first encryption key for the data device 14.

Although the first encryption key is described above as being generated (e.g., generated in real-time), in some examples, the first encryption key may be determined (e.g., determined in real-time). The first encryption key may be determined by being generated (as is discussed above) by the data device 14. Alternatively, the first encryption key may be determined in any other manner. For example, the first encryption key may be determined by selecting the first encryption key from a group of stored first encryption keys. As an example, the data device 14 may have thousands (or millions, or any other number) of first encryption keys stored on disk or accessible to the data device 14 (e.g., stored on a memory unit that the data device 14 has access to). In such an example, the data device 14 may determine a particular first encryption key by selecting it from these thousands (or millions, or any other number) of possible first encryption keys. This selection of the first encryption key may be performed in any manner (e.g., the selection may be pseudo random). Furthermore, because the data device 14 may store thousands (or millions, or any other number) of first encryption keys, the vast number of possible first encryption keys may prevent an unauthorized entity from determining which first encryption key was used, even if the unauthorized entity were to gain access to the data device 14.

Following generation of the first encryption key, the data device 14 may encrypt the data 30 at step 224. The data 30 may be encrypted in any manner using the first encryption key. For example, the data device 14 may utilize the first encryption key with one or more encryption methods 34 to encrypt the data 30. The encryption method(s) 34 used to encrypt the data 30 may be selected in any manner. For example, as is discussed above, the encryption method(s) 34 may be selected during the pairing process discussed above. This may, in some examples, allow the data device 14 and the receiving device 50 to select the same encryption method(s) 34 to use with the data 30.

Following encryption of the data 30, the data device 14 may generate a packet at step 228. The packet may be generated in any manner. In some examples, the packet may include information for use by the receiving device 50. For example, the packet may include an identifier (e.g., a header, trailer, etc.). The identifier of the packet may include an identification code (which may identify the packet as having been sent by the data device 14), a timestamp (which may identify the time and/or date the packet was created and/or transmitted by the data device 14, such as in a yyyy.dd-.HH.mm.sss format or any other format and at any time resolution), a parsing format identifier (which may identify how the packet was formed and how the data can be de-parsed), the determined checksum, a sequence number that may help to identify and recover from the event of a dropped packet within the communication between two devices, any other data, or any combination of the preceding.

In some examples, the checksum and/or any other information in the packet may be tokenized before being added to the packet. The tokenization of the checksum may refer to a process where one or more tokens are used to represent the checksum. This may allow the tokens to be sent in the packet, without the actual checksum being sent. The tokenization of the checksum (and/or any other information) may occur in any manner. As an example, the tokenization may occur using storage tokens and storage decoder values, as is discussed in U.S. Patent Application Publication No. 2019/0372945 entitled "System and Method for Securely Transferring Data. These storage tokens may match one or more receiving tokens in the receiving device 50, and may allow the receiving device 50 to re-construct the checksum. In some examples, the packet may include one or more chaff tokens, as is also discussed in U.S. Patent Application Publication No. 2019/0372945 entitled "System and Method for Securely Transferring Data. The checksum and/or any other information in the packet may be tokenized, encrypted, or made secret in any other manner. In other examples, the tokenization of the checksum and/or any other information in the packet may be optional.

Following generation of the packet, the data device 14 may transmit the packet and the encrypted data 30 at step 232. The data device 14 may transmit the packet and the encrypted data 30 to the receiving device 50. The data device 14 may transmit the packet and the encrypted data 30 in any manner and over any communications network. For example, the data device 14 may transmit the packet and the encrypted data 30 over the Internet (e.g., using a TCP communications protocol), a Wi-Fi network, a cellular network, a radio telecommunication network, a Bluetooth network, a NFC network, any other wireless network, any wired network, any other manner of transmission, or any combination of the preceding. Furthermore, the packet and the encrypted data 30 may be transmitted in a single transmission, but they may remain separate, in some examples. In some examples, the packet may be sent over separate communication protocol(s) and/or path(s) than the encrypted data 30, so as to further enhance security.

Following transmittal of the packet and the encrypted data 30, the receiving device 50 may receive the packet and the encrypted data 30 at step 236. After receiving the packet and the encrypted data 30, the receiving device 50 may determine whether the packet is legitimate at step 240. The receiving device 50 may determine whether the packet is legitimate in any manner. As an example, the receiving device 50 may analyze the identifier of the packet to determine whether or not the identifier of the packet includes an identification code that identifies the packet as having been sent by the data device 14. In some examples, if the packet is determined to not be legitimate, the packet may be disregarded by the receiving device 50, and the receiving device 50 may request the data 30 again. Alternatively, the receiving device may disregard the illegitimate packet and wait for a legitimate packet (as opposed to requesting re-transmission), in some examples.

In some examples, determining whether the packet is legitimate may include detokenizing the checksum (and/or any other information). The detokenization of the checksum (and/or any other information) may occur in any manner. As an example, the detokenization may occur using storage tokens, receiving tokens, and storage decoder values, as is discussed in U.S. Patent Application Publication No. 2019/0372945 entitled "System and Method for Securely Transferring Data.

In some examples, the receiving device 50 may determine whether the packet is legitimate by passing the packet to a library or application installed or accessible to the receiving device 50. In such an example, the library or application may determine whether packet is legitimate, may further detokenize the checksum, and may also pass the checksum back to the receiving device 50.

At step 244, the receiving device 50 may generate a second encryption key. As is discussed above, the second encryption key may be any type of key that is used with one or more encryption methods 34 to decrypt data. The second encryption key may be a random string of bits created for scrambling and unscrambling data. The second encryption key may have any length, may have any bits, and may be generated using any method. For example, the second encryption key may be generated using a pseudo random bit generator. In such an example, one or more seed values may be input into the pseudo random bit generator to generate the second encryption key (and any subsequent encryption key). The pseudo random bit generator and/or the seed value(s) may be selected in any manner. For example, the pseudo random bit generator and/or the seed value(s) may be selected during the pairing process discussed above. This may, in some examples, allow the data device 14 and the receiving device 50 to select the same pseudo random bit generator and/or the same seed value(s), and may further allow the data device 14 and the receiving device 50 to generate (or determine) matching encryption keys.

The second encryption key generated by the receiving device 50 may match the first encryption key generated by the data device 14. The second encryption key may match the first encryption key if the two encryption keys are identical (e.g., "58U48" and "58U48"). In other examples, the second encryption key may match the first encryption key in any other way that allows the second encryption key to be used to decrypt data 30 that was encrypted using the first encryption key.

The second encryption key may be generated in real time (e.g., generated only when it is needed for a secure transfer of data 30). This may prevent the second encryption key from having to be stored on disk. Instead, the second encryption key may only be stored in transient memory, as opposed to being stored on disk. Furthermore, once the second encryption key is used to decrypt the data 30, the second encryption key may be deleted (e.g., deleted from transient memory) or otherwise destroyed. As such, the second encryption key may be a one-time use encryption key that is destroyed after its use. This may prevent the second encryption key from being compromised if an unauthorized entity were to access the receiving device 50. In some examples, the second encryption key may not be deleted or otherwise destroyed.

The generation of the second encryption key by the receiving device 50 may refer to the receiving device 50 generating the second encryption key itself, or may refer to the receiving device 50 causing the second encryption key to be generated. For example, the receiving device 50 may generate the second encryption key by calling into a library or application installed or accessible to the receiving device 50, and having the library or application generate the second encryption key for the receiving device 50.

Although the second encryption key is described above as being generated (e.g., generated in real-time), in some examples, the second encryption key may be determined (e.g., determined in real-time). The second encryption key may be determined by being generated (as is discussed above) by the receiving device 50. Alternatively, the second encryption key may be determined in any other manner. For example, the second encryption key may be determined by selecting the second encryption key from a group of stored second encryption keys. As an example, the receiving device 50 may have thousands (or millions, or any other number) of second encryption keys stored on disk or accessible to the receiving device 50 (e.g., stored on a memory unit that the receiving device 50 has access to). In such an example, the receiving device 50 may determine a particular second encryption key by selecting it from these thousands (or millions, or any other number) of possible second encryption keys. This selection of the second encryption key may be performed in any manner (e.g., the selection may be pseudo random). Furthermore, because the receiving device 50 may store thousands (or millions, or any other number) of second encryption keys, the vast number of possible second encryption keys may prevent an unauthorized entity from determining which second encryption key was used, even if the unauthorized entity were to gain access to the receiving device 50.

Following the generation of the second encryption key, the receiving device 50 may decrypt the encrypted data 30 at step 248. The receiving device 50 may utilize the second encryption key to decrypt the encrypted data 30. The encrypted data 30 may be decrypted in any manner using the second encryption key. For example, the receiving device 50 may utilize the second encryption key with the same encryption method 34 that was used by the data device 14 to originally encrypt the data 30. In some examples, the receiving device 50 may select this same encryption method 34 during the pairing process discussed above. In other examples, the receiving device 50 may select this same encryption method 34 based on an identifier included in the packet, itself.

At step 252, the receiving device 50 may determine a second checksum of the data 30, and may compare it to the checksum received from the data device 14. The checksum may allow errors to be detected in the data 30. For example, the checksum may be used to detect errors that have been introduced into the data 30 during its transmission and/or storage. The receiving device 50 may determine the checksum in any manner. For example, the receiving device 50 may determine the checksum using a checksum algorithm. In some examples, the checksum may be derived from the data 30 in its raw form. The receiving device 50 may compare the two checksums in any manner. For example, the receiving device 50 may compare the two checksums using a Cyclic Redundancy Check (CRC). If the two checksums match, the receiving device 50 may move to step 256 where the data 30 is transmitted for use. If the two checksums do not match, the receiving device 50 may discard the data 30 (as it may include errors), and may request the data 30 again.

At step 256, the receiving device 50 may transmit the data 30 for use. In some examples, the receiving device 50 may transmit the data 30 to the user of the receiving device 50. In such an example, the transmission of the data 30 may refer to a transmission that causes the data 30 to be displayed on a display screen (e.g., displayed on a display screen of a smart monitor), and/or a transmission that causes the data 30 to be output to another user interface (e.g., output as sound from speakers or earphones of a mobile device). As such, the user may view, listen to, or otherwise access the data 30. In other examples, the receiving device 50 may transmit the data 30 for use by the receiving device 50. For example, the data 30 may be transmitted to an application or other program that is being executed by the processor of the receiving device 50. This may allow the application or other program to use or otherwise access the data 30. In additional examples, the receiving device 50 may transmit the data 30 to another device (e.g., a television that will display the data 30, a speaker that will play the data 30, another computer or mobile phone that originally requested the data 30 from the receiving device 50). In other examples, the transmission of the data 30 may refer to any other manner in which the receiving device 50 may utilize the data 30.

Following the transmission of the data 30, the data device 14 may determine whether to transmit additional data 30 at step 260. The data device 14 may determine whether to transmit additional data 30 for any reason. For example, a user of data device 14 may have selected to have additional data 30 transmitted. As another example, an application, program, and/or device on data device 14 may have provided additional data 30 to the data device 14 for transmittal. As an example of this, a camera may have recorded an additional frame (or set of frames) of video, and may have further provided it to the data device 14 for transmittal. As a further example, the data device 14 may have received a request from receiving device 50 for additional data 30. As an example of this, a user of receiving device 50 (or an "app" or other program installed on the receiving device 50) may have selected to request additional data 30. In such an example, the user may have selected a new document to review, may have selected a new video to watch, or may have selected a new song to purchase.

If it is determined at step 260 that additional data 30 should not be transmitted, the method 200 may move to step 264, where the method 200 ends. On the other hand, if it is determined that additional data 30 should be transmitted, the method 200 may move back up to step 212, where the data device 14 may retrieve the additional data 30. Then the method 200 may re-perform steps 212-260 so as to securely transfer the additional data 30.

Although the method 200 may re-perform steps 212-260, it may do so using different encryption keys. As such, even if an unauthorized entity were to determine the first encryption key, second encryption key, and/or data 30 from the previous transmission, these determinations would not help the unauthorized entity in subsequent transmission of data 30.

In order to utilize different encryption keys, both the data device 14 and the receiving device 50 may generate (or determine) new encryption keys. For example, for a second transmission, the data device 14 may generate (or determine) a third encryption key, and the receiving device 50 may generate (or determine) a fourth encryption key to decrypt data 30 encrypted using the third encryption key. This generation of new encryption keys may be similar to steps 220 and 244 discussed above.

The steps 212-260 may be re-performed for any number of times, so as to securely transmit any amount of data. As an example of this, the steps 212-260 may be re-performed for each frame of a video being transmitted to the receiving device 50. Furthermore, the steps 212-260 may continue to be performed even if a particular transmission of data 30 does not reach its intended recipient (i.e., the receiving device 50). As an example, if the receiving device 50 receives the third frame of a video, and also receives the fifth frame of the video (but never receives the fourth frame of the video, for some reason), the receiving device 50 may still be able decrypt and utilize the fifth frame of the video, and any subsequent frames. In such an example, the receiving device 50 may utilize the sequence number in the identifier of the packet (discussed above) to assist in identifying that the fourth frame was not received, and to further assist in decrypting and utilizing the fifth frame of the video. In traditional systems, such a failure to receive data in its proper order may cause issues. In contrast to this, the system 10 may be able to handle not receiving data in order. One reason for this is that each encryption key is generated in real time. This may allow the encryption key for the fifth frame to be generated despite the receiving device 50 having never received or decrypted the fourth frame, in some examples.

Modifications, additions, or omissions may be made to method 200. For example, although the steps of method 200 are described above as being performed by data device 14 or receiving device 50, in some examples, one or more of the steps of method 200 may be performed by any other device. As another example, one or more steps of method 200 may be optional, or may not be performed. For example, method 200 may not include step 208, where a connection is established. Instead, communication between the data device 14 and receiving device 50 may begin when the receiving device 50 requests data 30 or when the data device 14 starts transmitting data 30. As another example, method 200 may not include steps 216 and 252, regarding checksums. As a further example, the steps of method 200 may be performed in parallel or in any suitable order.

As is discussed above, in some examples, the information utilized by the data device 14 may not be stored on the data device 14. Instead, the data device 14 may merely have access to that information, in some examples. As one example of this, the information may be accessed by the data device 14 during a browser enabled communication session. Such a browser enabled communication session may allow for a compiled (binary) piece of code (or an uncompiled piece of code, such as pure Javascript) to be delivered to a browser and then executed as if the compiled piece of code (or the uncompiled piece of code) was installed on the data device 14. As such, the browser enabled communication session may allow for the secure transfer of data between the data device 14 and the receiving device 50, but may not require information associated with the secure transfer to be stored on and/or installed on the data device 14 and/or the browser. Instead, the information may be accessed by the data device 14 through the browser, and then the information may be deleted or otherwise freed from memory.

Additionally, the browser enabled communication session may provide for a one and done scenario with regard to the secure transfer of data, in some examples. In this one and done scenario, the browser enabled communication session may allow for single exchange (i.e., a single call) between the receiving device 50 (e.g., a web server hosting a website) and the data device 14 (e.g., a laptop running a browser so as to access the website hosted by the web server), where the single exchange (i.e., a single call) allows for initialization, pairing of the receiving device 50 and the data device 14, and the secure transfer of data 30 between the data device 14 and the receiving device 50. After this single exchange (i.e., a single call), the information (and data 30) used in the single exchange may be unloaded or deleted at both the data device 14 and the receiving device 50, allowing the process to be repeated (if desired) reliably. That is, the information (and data 30) is freed from memory in both the browser of the data device 14 and the receiving device 50 after the single exchange ends.

In some examples, the browser enabled communication session may also allow the receiving device 50 to more easily interact with many different data devices 14 simultaneously or substantially simultaneously (e.g., thousands of different data device 14 simultaneously or substantially simultaneously), so as to receive data 30 from each of these different data devices 14.

The browser may refer to an application that runs on a computing device (e.g., data device 14), receives formatted Hypertext Markup Language ("HTML") from a web server (or any other source), and renders a specific presentation of the HTML. The browser may have the ability to run scripts to manipulate and transform data on the computing device. In some examples, the browser may be a WebAssembly ("WASM") enabled browser that has the ability to interpret and transform a WASM enabled piece of data and execute the code that is represented by a WASM object. WASM may refer to a binary instruction format for a stack-based virtual machine. WASM is designed as a portable target for compilation of high-level languages, such as C/C++/Rust, enabling deployment on the web for client and server applications. In some example, this browser enabled communication session may also be used for browser-like applications (e.g., simulators).

A web server may refer to a server (e.g., a physical server) running in a data center that manages connections with browsers and routes the appropriate content to the connected browser. The web server may host a website, which may refer to an application that creates HTML content (primarily visual) and communicates the HTML content to the specified browser through HyperText Transfer Protocol ("HTTP") requests and HTTP responses. This content may contains scripts within the HTML that run as processes within the browser. The web server may also run a web service, which may refer to an application that handles requests and processing of specific data. A web service is commonly referred to as an API or a REST service.

An example of a browser enabled communication session may include a browser enabled communication session between the receiving device 50 (e.g., a web server hosting a website) and the data device 14 (e.g., a laptop running a browser so as to access the website hosted by the web server). The receiving device 50 may be associated with a service, such as a bank or an investment advisor service, in some examples. In such an example, the receiving device 50 may host a website that allows a user (e.g., a user of the data device 14) to access the user's account at the service.

The website hosted by the receiving device 50 may include one or more requests for data 30. For example, the website may include data fields that may be filled in by the user. Such data fields may include an account number data field, a password data field, a command data field (e.g., transfer instructions), any other data field, or any combination of the preceding. When the HTML of the website is executed by the browser of the data device 14, these requests for data 30 (e.g., data fields) may be displayed to the user. The user can then input the data 30 (e.g., by typing in the user's account information), and then the user can select for the data 30 to be transferred to the receiving device 50 (e.g., by selecting "submit" on the displayed website). In some examples, by hosting the website and providing the HTML content to the browser of the data device 14, the receiving device 50 may be requesting particular data 30 from the user and/or the data device 14, such as account information, password information, or any other data 30. In other examples, the data device 14 may transmit data 30 without having received a request for data at all.

In addition to including one or more requests for data 30, the website may also include information that allows for the secure transfer of the data 30 from the data device 14 to the receiving device 50. For example, the website may include all or a portion of the information that allows the data device 14 to pair with receiving device 50 (as is discussed above), synchronize with the receiving device 50 (as is also discussed above), generate a first encryption key (i.e., step 220), encrypt the data 30 (i.e., step 224), generate a packet (i.e., step 228), and/or transmit the packet and the encrypted data 30 (i.e., step 232). As an example of this, the website may include all or a portion of instructions 26, encryption methods 34, pseudo random bit generators, and/or any other information that allows for the secure transfer of data from the data device 14 to the receiving device 50. This information may be included in the website (or a web page of the website) in any manner. For example, the information may be wrapped using WASM and embedded in the website (or a web page of the website). This may allow the information to be accessed by the data device 14 (e.g., the processor 18 of the data device 14) when the browser executes the scripting language within the HTML of the website. As such, the information may not need to be stored or installed on the data device 14 or even on the browser. Instead, in some examples, the information may be accessed at run-time, and then the information may be deleted or freed from memory.

As is discussed above, a user can enter data 30 into a displayed website (or web page) and then have that data 30 transferred to the receiving device 50 (e.g., by selecting "submit" on the displayed website). When the user elects to have the data 30 transferred to the receiving device 50, the data device 14 may transmit the data 30 using the above information, so as to securely transfer the data 30 to the receiving device 50. For example, the data device 14 may access the above information in order to generate a first encryption key (i.e., step 220), encrypt the data 30 (i.e., step 224), generate a packet (i.e., step 228), and/or transmit the packet and the encrypted data 30 (i.e., step 232). In some examples, prior to securely transferring the data 30, the data 30 may be used to create a Java Script Object Notation ("JSON"), and this JSON (which includes the data 30) may then be securely transferred.

In some examples, all of the data provided by the user (e.g., all of the data input into the data fields) may be securely transferred to the receiving device 50 in this manner. In other examples, only a portion of the data provided by the user may be securely transferred to the receiving device 50 in this manner. For example, only the account information and password may be securely transferred to the receiving device 50 in this manner, while the remainder of the data may be transferred to the receiving device 50 in another manner (e.g., a less secure manner).

To transmit the packet and the encrypted data 30 (i.e., step 232), the packet and encrypted data 30 may be posted to the web service of the receiving device 50 via a web call. The receiving device 50 may then see this posting and route the packet and encrypted data 30 to its web service. This is one example of step 236 (i.e., receive the packet) of FIG. 2. The receiving device 50 may then process the received packet and the encrypted data 30. For example, the receiving device 50 may use its web service to process the received packet and the encrypted data 30. As an example of this processing, the receiving device 50 may determine a second encryption key (i.e., step 244), decrypt the encrypted data 30 (i.e., step 248), and/or transmit the data 30 for use (i.e., step 256). In some examples, the receiving device 50 may transmit the data 30 for use in any manner (e.g., transmit it for display to a user, transmit it for storage, transmit it for execution, transmit it for use in any other manner, or any combination of the preceding).

The receiving device 50 may process the received packet and the encrypted data 30 using instructions 62, encryption methods 34, and/or pseudo random bit generators—all (or a portion of which) may be stored on the receiving device 50. That is, unlike the data device 14 in the browser enabled communication session, this information utilized by the receiving device 50 in the secure transfer may be stored on and/or installed on the receiving device 50. However, after the single exchange (i.e., a single call) between the receiving device 50 and the data device 14 is finished, the particular information associated with that single exchange (e.g., the second encryption key) may be deleted or freed from the memory of the receiving device 50.

In various embodiments, the herein described systems, devices (e.g., data device 14, receiving device 50), components of the devices, and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some examples may be implemented using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. Computers and computer systems described herein (e.g., data device 14, receiving device 50) may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any manner of storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or re-writable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the examples as described hereinabove may be implemented in many different examples of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated embodiments do not limit the present disclosure. The instructions may be implemented, for example, using any suitable programming language, which may include high-level, low-level, object-oriented, visual, compiled or interpreted programming languages, such as, but not limited to, C, C++, C#, Java, BASIC, SQL, Perl, Matlab, Pascal, Visual BASIC, assembly language, machine code, and so forth. The examples are not limited in this context.

The methods, systems, devices (e.g., data device 14, receiving device 50), and components of the devices have been illustrated and described herein as comprising several separate functional elements, such as modules or units. Although certain of such modules or units may be described by way of example, it can be appreciated that a greater or lesser number of modules or units may be used and still fall within the scope of the examples. Further, although various examples may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain examples of the present disclosure, such substitution is considered within the scope of the present disclosure. In one example, the all or a portion of the system, its features or functional elements, modules, units, etc. or one or more steps of the method may be associated with, implemented by, executed on, or embedded in (e.g., as embedded software/firmware) one or more hardware components, (e.g., as described above). Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The examples are not limited in this context It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The examples are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed steps, components, elements, features, aspects, characteristics, limitations, and the like, of the various non-limiting and non-exhaustive examples described in this specification. In this manner, Applicant reserves the right to amend the claims during prosecution to add features as variously described in this specification.

What is claimed is:

1. A system, comprising:
    a second computing device comprising:
        one or more memory units;
        one or more processors coupled to the memory units and configured, upon executing one or more instructions, to:
            receive encrypted data from a first computing device, wherein the encrypted data is encrypted based on a first encryption key that was pseudo randomly generated, by the first computing device, utilizing a first pseudo random bit generator;
            utilize a second pseudo random bit generator to pseudo randomly generate, in real time following reception of the encrypted data, a second encryption key that matches the first encryption key, wherein the second pseudo random bit generator is synchronized with the first pseudo random bit generator;
            store the second encryption key in transient memory only;
            decrypt the encrypted data using the second encryption key;
            delete or destroy the second encryption key from transient memory; and
            transmit the data for use.

2. The system of claim 1, wherein the one or more processors of the second computing device are further configured, upon executing the one or more instructions, to generate the second encryption key using one or more seed values.

3. The system of claim 1, wherein the second encryption key is identical to the first encryption key.

4. The system of claim 1, wherein transmitting the data for use comprises transmitting the data for storage or transmitting the data for display to a user.

5. The system of claim 1, wherein the one or more processors of the second computing device are further configured, upon executing the one or more instructions, to:
    receive second encrypted data from the first computing device, wherein the second encrypted data is encrypted based on a third encryption key;
    generate a fourth encryption key that matches the third encryption key;
    decrypt the second encrypted data using the fourth encryption key; and
    transmit the second data for use.

6. The system of claim 1, wherein the data is a frame of a video.

7. The system of claim 1, wherein the second computing device is or includes a monitor.

8. A method, comprising:
    receiving, by one or more processors of a second computing device, encrypted data from a first computing device, wherein the encrypted data is encrypted based on a first encryption key that was pseudo randomly generated, by the first computing device, utilizing a first pseudo random bit generator;
    following reception of the encrypted data, pseudo randomly generating, in real time by the one or more processors of the second computing device and utilizing a second pseudo random bit generator, a second encryption key that matches the first encryption key, wherein the second pseudo random bit generator is synchronized with the first pseudo random bit generator;
    storing, by the one or more processors of the second computing device, the second encryption key in transient memory;
    decrypting, by the one or more processors of the second computing device, the encrypted data using the second encryption key;
    deleting or destroying, by the one or more processors of the second computing device, the second encryption key from transient memory; and
    transmitting, by the one or more processors of the second computing device, the data for use.

9. The method of claim 8, wherein generating the second encryption key comprises generating the second encryption key using one or more seed values.

10. The method of claim 8, wherein the second encryption key is identical to the first encryption key.

11. The method of claim 8, wherein transmitting the data for use comprises transmitting the data for storage or transmitting the data for display to a user.

12. The method of claim 8, further comprising:
    receiving, by the one or more processors of the second computing device, second encrypted data from the first computing device, wherein the second encrypted data is encrypted based on a third encryption key;
    generating, by the one or more processors of the second computing device, a fourth encryption key that matches the third encryption key;
    decrypting, by the one or more processors of the second computing device, the second encrypted data using the fourth encryption key; and
    transmitting, by the one or more processors of the second computing device, the second data for use.

13. The method of claim 8, wherein the data is a frame of a video.

14. Tangible, non-transitory computer-readable media comprising instructions stored therein, wherein the instructions, when executed, cause a second computing device to perform functions comprising:
    receiving encrypted data from a first computing device, wherein the encrypted data is encrypted based on a first encryption key that was pseudo randomly generated, by the first computing device, utilizing a first pseudo random bit generator;
    following reception of the encrypted data, utilizing a second pseudo random bit generator to pseudo randomly generate, in real time, a second encryption key that matches the first encryption key, wherein the second pseudo random bit generator is synchronized with the first pseudo random bit generator;
storing the second encryption key in transient memory;
decrypting the encrypted data using the second encryption key;
deleting or destroying the second encryption key from transient memory; and
transmitting the data for use.

15. The tangible, non-transitory computer-readable media of claim 14, wherein the instructions, when executed, cause the second computing device to perform functions comprising generating the second encryption key using one or more seed values.

* * * * *